Patented Sept. 30, 1952

2,612,510

UNITED STATES PATENT OFFICE 2,612,510

CROSS-LINKED SILANES

David B. Hatcher and Raymond H. Bunnell, Toledo, Ohio, assignors to Libbey-Owens-Ford Glass Company, Toledo, Ohio, a corporation of Ohio No Drawing. Application January 6, 1950, Serial No. 137,274

9 Claims. (Cl. 260—448.2)

The invention relates to novel hydrolyzable cross-linked silanes, whose molecule contains at least two silicon atoms connected through carbon atoms.

The usual starting material for the production of organosilicon compositions of the curable type is a mixture of silanes each of whose molecules consists of a silicon atom to which are attached four monovalent radicals, some of which are readily hydrolyzable and the others of which are joined to the silicon atom through carbon atoms. Hydrolysis of such a mixture of silanes replaces each hydrolyzable radical with a hydroxy radical, and the hydrolysis ordinarily is accompanied by condensation of part of the hydroxy radicals. In such condensation, a hydroxy radical connected to one silicon atom condenses with a hydroxy radical connected to another silicon atom to form an oxygen linkage between the two silicon atoms, with the production of one molecule of water as a by-product.

Curable organosilicon compositions produced by the hydrolysis (with partial condensation) of such a mixture of silanes can be used in coating, impregnating and laminating operations like other curable condensation products, although curable organosilicon compositions are superior to other curable condensation products in heat resistance and other properties. During the curing of an organosilicon composition which is carried out to produce a finished coating, laminate or other product, the condensation of the hydroxy radicals is substantially completed to produce an infusible heat-resistant silicone resin.

The hydrolysis of pure diethyldichlorosilane (with condensation) produces a non-curable oil. United States Patent No. 2,258,220 discloses the production of curable compositions by hydrolysis of a mixture of an ethyltrihalosilane with a diethyldihalosilane. However, it has been found that the curable compositions whose production is disclosed in that patent have serious disadvantages. Coatings made of such compositions are subject to severe cracking and crazing. The cracking of such coatings may be due to excessive shrinkage upon condensation or to the fact that the diethyldihalosilane upon hydrolysis tends to form cyclic condensation products which are volatile and evaporate during the curing of the composition. The loss of cyclic condensation products by evaporation tends to cause shrinkage and cracking and leaves a resin which because of its low ethyl-to-silicon ratio is excessively brittle.

It has been found that the addition, to such a mixture of ethylhalosilanes, of a substance whose molecule consists of two or more silicon atoms which are connected through carbon atoms and to each of which are attached hydrolyzable radicals produces an important improvement in the quality of the silicone resin that is formed by hydrolysis of the mixture of ethylhalosilanes. The resulting modified ethyl silicone resin produces clear, crack-free coatings which cure faster and are more flexible than coatings made from an unmodified ethyl silicone resin.

The principal object of the invention is to provide novel hydrolyzable cross-linked silanes which are relatively inexpensive to produce and which are highly advantageous for cohydrolysis with known silanes. More specific objects and advantages are apparent from the description, which illustrates and discloses but is not intended to limit the scope of the invention.

An organosilicon compound embodying the invention has the general formula

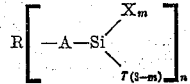

wherein R is an aromatic radical in which any atom other than carbon and hydrogen consists of a nuclear halogen having an atomic weight less than 80, and in which any exocyclic carbon atom is contained in a methyl side chain; A is a saturated divalent aliphatic radical, having from one to three carbon atoms, in which the free valences are connected through not more than two carbon atoms in series and in which any atom other than carbon and hydrogen consists of a halogen having an atomic weight between 35 and 80; X is a halogen having an atomic weight less than 80; $r$ is a saturated primary aliphatic hydrocarbon radical having from one to three carbon atoms; $m$ is an integer from 2 to 3; and $n$ is an integer from 2 to 3.

A halogen (X) attached to a silicon atom in a compound of the invention may be any halogen having an atomic weight less than 80 (i. e., chloro, bromo, or fluoro).

A saturated primary aliphatic hydrocarbon radical having from one to three carbon atoms ($r$) is a methyl, ethyl or n-propyl radical.

An aromatic radical (R) in which any atom other than carbon and hydrogen consists of a nuclear halogen having an atomic weight less than 80, and in which any exocyclic carbon atom is contained in a methyl side chain, may be any radical having from one to three benzene nuclei that contain from 6 to 18 carbon atoms (e. g., radicals of the benzene, naphthalene, anthracene, phenanthrene, diphenyl or terphenyl series) having no side chains or having from one to three side chains each of which is methyl, and having no substituents or having from one to three nuclear substituents each of which is a halogen of atomic weight less than 80. Such radicals include: phenyl, tolyl, xylyl, diphenyl, terphenyl, naphthyl, 1-methyl naphthyl, 2-methyl naphthyl, anthracyl, 9-methyl anthracyl, 2,3-dimethyl anthracyl, 2,4-dimethyl anthracyl, bromophenyl, o - bromotolyl, m - bromotolyl, p - bromotolyl, o - chlorotolyl, m - chlorotolyl, p - chlorotolyl, 2-chloro-m-fluorotolyl, 2,6-dichlorotolyl, 4-bromo-o-xylyl, 4-bromo-m-xylyl, 2-bromo-p-xylyl, 3 - bromo - o - xylyl, chlorophenyl, 1-chloro-4-fluorophenyl, alpha-bromonaphthyl, beta-bromonaphthyl, 2-chloronaphthyl, 1-bromo-3-chloronaphthyl, 2-chloro-1-methyl naphthyl, 1-bromo-8-methyl naphthyl, 1-bromo-7-methyl naphthyl, 7-chloro-1-methyl naphthyl, 1-bromo-2-methyl naphthyl, 4-bromo-2-methyl naphthyl, 8-bromo-2-methyl naphthyl, 1-bromo-5-methyl naphthyl, 1-bromo-2,7-dimethyl naphthyl, 4-bromo-1,6-dimethyl naphthyl, 1-bromo-2,6-dimethyl naphthyl, 4-bromo-1,2-dimethyl naphthyl, 1-bromo-2,3-dimethyl naphthyl, 1-bromo-4-methyl naphthyl, 7-bromo-1-methyl naphthyl, 1,10-dibromoanthracyl, 9,10-dichloroanthracyl, phenanthryl, 3-methyl phenanthryl, and 1,4-dimethylphenanthryl.

A saturated divalent aliphatic radical, having from one to three carbon atoms (A), in which the free valences are connected through not more than two carbon atoms in series and in which any atom other than carbon and hydrogen consists of a halogen having an atomic weight between 35 and 80, is a divalent aliphatic hydrocarbon radical which has saturated

bonds, which is unsubstituted, or substituted with a halogen having an atomic weight between 35 and 80 (i. e., chloro or bromo) and which has not more than three carbon atoms. Such a divalent aliphatic hydrocarbon radical connecting a silicon atom to a nuclear carbon atom can be considered to be derived (1) by the removal of two hydrogen atoms from the same carbon atom or different carbon atoms in the molecule of a saturated aliphatic hydrocarbon having from one to two carbon atoms or by the removal of two hydrogen atoms from the same carbon atom or two adjacent carbon atoms in the molecule of a saturated aliphatic hydrocarbon having three carbon atoms (i. e., the divalent hydrocarbon radical may be methylene, ethylene, methyl methylene, ethyl methylene, dimethyl methylene, or 1- or 2-methyl ethylene) or (2) by the removal of two hydrogen atoms from a molecule as described in (1) in which a hydrogen atom has been replaced with a chlorine or bromine atom.

It is preferred that an organosilicon compound embodying the invention be one having the general formula hereinbefore defined in which $m$ is 3 (for reasons hereinafter explained). It is preferred also that R have no side chains and that A have two carbon atoms. It is desirable that $n$ be 2 since a substance in which $n$ is 2 is less expensive to produce than a substance in which $n$ is 3. It is desirable also that X be chloro (for reasons hereinafter explained).

Substances embodying the invention include: bis(trichlorosilylethyl) benzenes, bis(trichlorosilylchloroethyl) benzenes, tris(trichlorosilylethyl) benzenes, bis(trichlorosilylethyl) chlorobenzenes, tris(trichlorosilylethyl) chlorobenzenes, bis(trichlorosilylisopropyl) toluenes, tris(trichlorosilylisopropyl) toluenes, bis(trichlorosilylisopropyl) benzenes, tris(trichlorosilylisopropyl) benzenes, bis(ethyldichlorosilylethyl) toluenes, tris(ethyldichlorosilylethyl) toluenes, bis(trichlorosilylethyl) toluenes, tris(trichlorosilylethyl) toluenes, bistrichlorosilylisopropyl) dichlorobenzenes, tris(trichlorosilylisopropyl) dichlorobenzenes, bis(trichlorosilylethyl) dichlorobenzenes, and tris(trichlorosilylethyl) dichlorobenzenes.

An organosilicon compound embodying the invention can be obtained by reacting in the presence of an aluminum halide a composition comprising two substances. In such a reaction halogen atoms are split out of aliphatic radicals in two or three molecules of one substance, and two or three hydrogen atoms are split out of an aromatic nucleus in one molecule of the other substance so that the reacting molecules are linked into a single molecule by

bonds.

One of these two substances is an aromatic compound whose molecule consists of from one to three benzene nuclei that contain from 6 to 18 carbon atoms, having hydrogen atoms attached to at least two nuclear carbon atoms, having no substituents or having not more than three nuclear substituents each of which is a halogen of atomic weight less than 80, and having no side chains or having not more than three side chains each of which is a methyl radical. Such aromatic compounds include benzene, toluene, xylenes, diphenyl, terphenyls, naphthalene, 1-methyl naphthalene, 2-methyl naphthalene, anthracene, 9-methyl anthracene, 2,3-dimethyl anthracene, 2,4-dimethyl anthracene, bromobenzene, o-bromotoluene, m-bromotoluene, p-bromotoluene, o-chlorotoluene, m-chlorotoluene, p-chlorotoluene, 2-chloro-m-fluorotoluene, 2,6-dichlorotoluene, 4-bromo-o-xylene, 4-bromo-m-xylene, 2-bromo-p-xylene, 3-bromo-o-xylene, chlorobenzene, 1-chloro-4-fluorobenzene, alpha - bromonaphthalene, beta - bromonaphthalene, 2-chloronaphthalene, 1-bromo-3-chloronaphthalene, 2-chloro-1-methyl naphthalene, 1-bromo-8-methyl naphthalene, 1-bromo-7-methyl naphthalene, 7-chloro-1-methyl naphthalene, 1 - bromo - 2 - methyl naphthalene, 4-bromo-2-methyl naphthalene, 8-bromo-2-methyl naphthalene, 1-bromo-5-methyl naphthalene, 1-bromo-2,7-dimethyl naphthalene, 4-bromo-1,6-dimethyl naphthalene, 1 - bromo - 2,6 - dimethyl naphthalene, 4-bromo-1,2-dimethyl naphthalene, 1-bromo-2,3-dimethyl naphthalene, 1-bromo-4-methyl naphthalene, 7-bromo-1-methyl naphthalene, 9,10-dibromoanthracene, 9,10-dichloroanthracene, phenanthrene, 3 - methyl phenanthrene, 1,4-dimethylphenanthrene, and o-, m- and p-dichlorobenzenes.

The other of these two substances is a haloalkylsilane whose molecule consists of a silicon atom to which are attached four monovalent radicals one of which is an alpha- or beta-halosubstituted primary or secondary aliphatic hydrocarbon radical having from one to three carbon atoms, in which the halogen atom has an atomic weight between 35 and 80 (i. e., a chloro- or bromo-substituted methyl radical; an alpha- or beta- chloro- or bromo-substituted ethyl radical; or an alpha or beta chloro- or bromo-substituted propyl or isopropyl radical); from two to three of which are halogens having an atomic weight less than 80; the remaining radical, if any, being a saturated primary aliphatic hydrocarbon radical having from one to three carbon atoms (i. e., a methyl radical, an ethyl radical or an n-propyl radical). Such haloalkylsilanes include alpha - chloroethyltrichlorosilane, beta - chloroethyltrichlorosilane, alpha - chloropropyltrichlorsilane, chloromethyltrichlorosilane, beta - chloropropyltrichlorosilane, and alpha-chloroethyl-ethyldichlorosilane.

These haloalkylsilanes and others which may be used to prepare compounds of the invention are prepared by chlorinating or brominating such substances as methyltrichlorosilane, ethyltrifluorosilane, diethyldifluorosilane, isopropyltrifluorosilane, ethyldifluorochlorosilane, ethylfluorodichlorosilane, isopropyldifluorochlorosilane, isopropylfluorodichlorosilane, ethyltrichlorosilane, propyltrichlorosilane, propyltrifluorosilane, diethyldichlorosilane, ethylpropyldichlorosilane, isopropyltrichlorosilane, ethylmethyldichlorosilane, and methylpropyldichlorosilane. It is preferred that the halogen atom introduced into the aliphatic radical and the halogen atoms attached to the silicon atom be chlorine, since chlorine is a cheaper raw material than bromine. It is preferred that compounds embodying the invention be formed from starting materials which are alkyltrihalosilanes. Better yields of the mono-chlorinated product can be obtained by chlorination of a silane containing only one alkyl radical. The chlorination of an alkyltrihalosilane, such as ethyltrichlorosilane, is a clear cut reaction that proceeds smoothly and rapidly to give a mixture of unchlorinated ethyltrichlorosilane, alpha - chloroethyltrichlorosilane, beta-chloroethyltrichlorosilane, alpha,beta-dichloroethyltrichlorosilane, and some polychlorinated ethyltrichlorosilanes. Beta-chloroethyltrichlorosilane is obtained in the largest amount.

The method of chlorinating silanes to prepare haloalkylsilanes for use as starting materials for the preparation of compounds of the invention may comprise any desired procedure. For example, a chloro group may be introduced by a liquid phase reaction in which molecular chlorine is brought into contact with the liquid silane to be chlorinated. Ultraviolet light is required to conduct the reaction. The reaction is usually conducted at atmospheric pressure and at a slightly elevated temperature, the maximum temperature at atmospheric pressure being limited by the boiling temperature of the silane to be chlorinated. It is desirable that the chlorine be bubbled into the silane in order to avoid high local chlorine concentrations which are likely to result in burning of the silane and a corresponding darkening of the product. The chlorination proceeds at such a rate in ordinary laboratory apparatus that about one mol of a silane can be chlorinated per hour when the chlorine is introduced through a single jet. Ordinarily, about one mol of chlorine is used per mol of silane to be mono-chlorinated but the amount that is used can be regulated to control the extent of the chlorination. The silane is placed in a suitable reactor and chlorine is admitted (at the bottom of the reactor) as comparatively small bubbles. The chlorine can be dispersed by means of small glass Raschig rings placed at the bottom of the reactor. Ultraviolet light is used to catalyze the chlorination (e. g., from a high pressure mercury vapor lamp equipped with a filter which absorbs all radiation having a wave length shorter than 2800 angstrom units, 60 per cent of the radiation having a wave length shorter than 3400 angstrom units and 10 per cent of the radiation having a wave length shorter than 4400 angstrom units; such a lamp is the "Mazda CH-4" 100 watt ultraviolet lamp). The reaction proceeds at a faster rate at elevated temperatures; so it is ordinarily most desirable to conduct it at a temperature of at least about 50 degrees C. It is not desirable to conduct the reaction at a temperature higher than about 150 degrees C., even if the boiling point of the silane to be chlorinated is higher than 150 degrees C. It is most desirable to conduct the reaction at a temperature not higher than about 75 degrees C. Chlorination of a silane can be conducted at a relatively rapid rate. The chlorine is usually introduced (as comparatively small bubbles) through a jet at a rate not less than about 0.7 mol per hour (if it is desired to chlorinate large quantities of a silane, the chlorine can be introduced simultaneously through each of two or more jets at the specified rate). It is most desirable that the rate be at least about 0.9 mol per hour, and not greater than about 1.1 moles per hour.

The reaction can be conducted continuously or as a batch process. When it is run continuously, the liquid silane is passed through a tube, and the chlorine is admitted through jets along the length of the tube. The amount of chlorine introduced per hour per jet is such that the ratio of chlorine to silane does not give an explosive mixture at any point in the reactor; the same considerations govern the amount of chlorine when the reaction is conducted continuously as when it is conducted batchwise. The jets should be so spaced that the temperature of the reaction mixture does not substantially increase or decrease progressively along the length of the reaction tube (i. e., the jets should be sufficiently far apart so that the temperature of the liquid into which chlorine is introduced from any one jet is not substantially higher than the temperature of the liquid into which chlorine is introduced from any other jet).

The hydrogen chloride evolved during the chlorination is collected in a water scrubber. The amount of hydrogen chloride absorbed in the water scrubber may be determined at intervals by titration with sodium hydroxide or potassium hydroxide, or the scrub water may be passed into a flask containing the base and an indicator such as methyl orange until the indicator shows the base to be neutralized.

The aluminum halide used in the preparation of compounds embodying the invention is one in which each halogen atom has an atomic weight between 35 and 80 (i. e., aluminum chloride or aluminum bromide). The terms "aluminum chloride" and "aluminum bromide" are used herein to mean anhydrous aluminum chloride and anhydrous aluminum bromide. The preferred aluminum halide is aluminum chloride.

The procedure for contacting the aluminum halide with the haloalkylsilane (as hereinbefore defined) and the aromatic compound (as hereinbefore defined) in order to prepare compounds of the invention comprises adding the aluminum halide in small portions to a mixture of the haloalkylsilane and the aromatic compound. Usually, the first portion of the aluminum halide (¼ to ⅓ of total amount to be added) is added very carefully at room temperature to the reaction mixture, which is then heated for about 20 minutes. The remainder of the aluminum halide is then added in portions large enough to maintain a fairly vigorous rate of reaction, with heating between additions, and after the entire amount of the aluminum halide has been added, the reaction mixture is refluxed for the length of time necessary to complete the reaction and drive off HCl. When the reaction goes rather slowly, the heating may be continued while the remainder of the aluminum halide is added in small portions. When the concentration of aluminum halide is maintained at the minimum necessary for reaction, it is possible to isolate the pure product by double distillation. It is usually desirable, however, to remove the catalyst before distillation, for example, by adding to the reaction mixture phosphorus oxychloride, which binds aluminum chloride by reacting with it to form a stable complex. An amount of phosphorus oxychloride equivalent to the amount of aluminum chloride present in the reaction mixture (or in slight excess over the amount of aluminum chloride) is added to the reaction mixture when the mixture has cooled to a temperature slightly below the boiling point of phosphorus oxychloride (107° C.). After further cooling an amount of a hydrocarbon solvent equal to the volume of the reaction mixture is added to precipitate the $AlCl_3 \cdot POCl_3$ complex. Such hydrocarbon solvents include pentane, ligroin and petroleum ethers. The mixture is allowed to stand overnight, and the solid complex is filtered from the solution or the liquid to be distilled is decanted from the mixture, leaving a residue containing the $AlCl_3 \cdot POCl_3$ complex. An absorbing agent such as kieselguhr may be added in place of or in addition to the hydrocarbon solvent to absorb the $AlCl_3 \cdot POCl_3$ complex, and after the reaction mixture cools to room temperature the liquid to be distilled may be filtered from the absorbed complex. There is less chance that aluminum chloride will distill with the product when it is in the form of a complex than when it is in the free state, and when this complex is relatively non-volatile as compared to the organosilane product the product may be distilled under reduced pressure in the presence of the $AlCl_3 \cdot POCl_3$ complex.

The aluminum halide should not be added in excess of about 5 mole per cent (based upon the amount of haloalkylsilane present in the reaction mixture). It is most desirable that the amount of the aluminum halide used be not more than about 2 mole per cent and not less than about .75 mole per cent.

It is desirable to use an excess of haloalkylsilane over aromatic compound in order to obtain a high yield of the compounds embodying the invention. The amount of haloalkylsilane should be not less than about 1 mole per mole of aromatic compound, and it is preferred that it be not less than about 1.5 moles per mole of aromatic compound. It is preferred that the molar ratio of haloalkylsilane to aromatic compound be not more than about 2.5 to 1, and most desirable that it be not more than about 2 to 1, although any larger ratio that gives a substantial yield of the desired product may be used. On the other hand, if an excess of aromatic compound over haloalkylsilane is reacted according to the procedure hereinbefore described, for example 3 moles of aromatic compound per mole of haloalkylsilane, a large yield of a mono(silylalkyl)aromatic compound is obtained. Compounds embodying the invention can be obtained by reacting in the presence of an aluminum halide (as hereinbefore described) such a mono(silylalkyl)aromatic compound with an additional amount of the haloalkylsilane used in the preparation of the mono(silylalkyl)aromatic compound.

Substances embodying the invention, having the general formula hereinbefore defined, in which A is a halo-substituted divalent aliphatic radical (as hereinbefore described) are prepared by chlorinating or brominating an organosilicon compound of the invention produced by the reaction of a haloalkylsilane and an aromatic compound in the presence of an aluminum halide (as hereinbefore described). It is preferred that the halogen atom introduced into the divalent aliphatic radical be chlorine, since chlorine is a cheaper raw material than bromine. The method of chlorinating may be the one using ultraviolet light as hereinbefore described or any other method. When the aryl group in an organosilicon compound of the invention contains methyl radicals, halogenation may take place on the methyl radicals. Thus the compound to be halogenated preferably is one having the general formula hereinbefore defined in which R contains no side chains.

Compounds embodying the invention may be prepared by one of the procedures described in the following examples:

*Example 1*

A haloalkylsilane (2.27 mols of beta-chloroethyltrichlorosilane) is mixed with an aromatic compound (1.36 mols of benzene) in a 1 liter 3-necked flask equipped with a mercury sealed stirrer and a reflux condenser fitted with a calcium chloride tube. The mixture is stirred and gently heated while an aluminum halide (2 mol per cent of aluminum chloride based on the amount of haloalkylsilane) is added in small portions over a period of one hour. After the addition of aluminum chloride is completed, the mixture is refluxed for one hour. The mixture is then cooled to about 95 degrees C. and phosphorus oxychloride (5 cc.) is added to complex the aluminum chloride. After further cooling, a hydrocarbon solvent (500 cc. of "Sohio S. R. Solvent," a petroleum fraction composed mainly of aliphatic hydrocarbon material, boiling within the range 100 to 286 degrees F.) is added to precipitate the $AlCl_3 \cdot POCl_3$ complex. The mixture is allowed to stand overnight and is then filtered. The filtrate is place in a 1 liter Claisen flask and the excess hydrocarbon solvent is distilled at atmospheric pressure. The residue is then distilled at reduced pressure to recover all the material boiling at temperatures up to 220 degrees C. at 1 mm. Hg (absolute pressure). This material is distilled to yield a fraction (134 grams), B. P. 154–174 degrees C. at 1 mm. Hg. This fraction is redistilled to yield a bis(2-trichlorosilylethyl)benzene, B. P. 155–165 degrees C. at 1 mm. Hg.

*Example 2*

A haloalkylsilane (1 mol of beta-chloroethyltrichlorosilane) and an aromatic hydrocarbon (.6 mol of chlorobenzene) are placed in a 1 liter three-necked flask equipped with a mercury sealed stirrer and a reflux condenser fitted with a calcium chloride tube. The mixture is gently heated and stirred while an aluminum halide (2 mol per cent of aluminum chloride based on the amount of haloalkylsilane) is added in small portions over a period of forty minutes. The mixture is then refluxed for about three more hours. The mixture is cooled to a temperature of about 95 degrees C. and phosphorus oxychloride (3.2 cc.) is added to complex the aluminum chloride. After further cooling, a hydrocarbon solvent (275 cc. of "Sohio S. R. Solvent") is added to precipitate the $AlCl_3.POCl_3$ complex. The mixture is allowed to stand overnight and is then filtered. The filtrate is placed in a 1 liter Claisen flask and the excess hydrocarbon solvent is distilled at atmospheric pressure. The residue is then distilled under reduced pressure to yield a bis(2 - trichlorosilylethyl)chlorobenzene (49 grams), B. P. 192–195 degrees C. at 1 mm. Hg.

*Example 3*

(a) By a procedure similar to that described in the preceding examples beta-chloropropyltrichlorosilane is reacted with toluene to obtain a mixture comprising a bis(2-trichlorosilylisopropyl)toluene and a tris(2-trichlorosilylisopropyl)toluene.

(b) By a procedure similar to that described in the preceding examples beta-chloropropyltrichlorosilane is reacted with benzene to obtain a mixture comprising a bis(2-trichlorosilylisopropyl)benzene and a tris(2-trichlorosilylisopropyl)benzene.

(c) By a procedure similar to that described in the preceding examples alpha- or beta-chloroethylethyldichlorosilane is reacted with toluene to obtain a mixture comprising a bis(ethyldichlorosilylethyl)toluene and a tris(ethyldichlorosilylethyl)toluene.

(d) By a procedure similar to that described in the preceding examples alpha-chloroethyltrichlorosilane is reacted with toluene to obtain a mixture comprising a bis(1-trichlorosilylethyl)-toluene and a tris(1-trichlorosilylethyl) toluene.

(e) By a procedure similar to that described in the preceding examples alpha-chloroethyltrichlorosilane is reacted with chlorobenzene to obtain a mixture comprising a bis(1-trichlorosilylethyl)chlorobenzene and a tris(1-trichlorosilylethyl)chlorobenzene.

(f) By a procedure similar to that described in the preceding examples beta-chloropropyltrichlorosilane and o-dichlorobenzene are reacted to obtain a mixture comprising a bis(beta-trichlorosilylisopropyl)dichlorobenzene and a tris(beta-trichlorosilylisopropyl)dichlorobenzene.

(g) By a procedure similar to that described in the preceding examples beta-chloroethyltrichlorosilane is reacted with o-dichlorobenzene to obtain a mixture comprising a bis(2-trichlorosilylethyl)dichlorobenzene and a tris(2-tricholorsilylethyl)dichlorobenzene.

*Example 4*

A haloalkylsilane (66½ grams of beta-chloroethyltrichlorosilane) and an aromatic hydrocarbon (78 grams of benzene) are mixed in a 500 ml. three-necked flask equipped with a mercury sealed stirrer and a reflux condenser fitted with a calcium chloride tube. Aluminum chloride (0.55 gram) is added to the stirred mixture in small portions. The mixture is heated gently for about twenty minutes. The heating is then discontinued for twenty minutes during which time HCl is evolved vigorously. The mixture is again heated for 35 minutes before distilling under reduced pressure to yield crude beta-phenylethyltrichlorosilane (52 grams), B. P. 164–174 degrees C. at 80 mm. Hg. This product is redistilled under reduced pressure to yield colorless beta-phenylethyltrichlorosilane, B. P. 107–108 degrees C. at 2 mm. Hg.

An aralykylsilane (397 grams of beta-phenylethyltrichlorosilane prepared by several runs according to the procedure described in the preceding paragraph) is mixed with a haloalkylsilane (109 grams of beta-chloroethyltrichlorosilane), and an aluminum halide (1.47 grams of aluminum chloride) is added, using the apparatus and procedure described in Example 1. After the addition of aluminum chloride is completed, the mixture is refluxed for five hours. The mixture is then cooled to about 95 degrees C. and phosphorus oxychloride (1.4 cc.) is added to complex the aluminum chloride. After further cooling, a hydrocarbon solvent (500 cc. of "Sohio S. R. Solvent") is added to precipitate the $AlCl_3.POCl_3$ complex. The mixture is allowed to stand overnight and is then filtered. The filtrate is placed in a 1 liter Claisen flask and the excess hydrocarbon solvent is distilled at atmospheric pressure before distilling at reduced pressure to obtain a fraction (57 grams), B. P. 65 degrees C. at 20 mm. Hg to 117 degrees C. at 14 mm. Hg and an other fraction (274 grams), B. P. 117 degrees C. at 14 mm. Hg to 168 degrees C. at 1 mm. Hg. This latter fraction is redistilled to recover unreacted beta-phenylethyltrichlorosilane (124 grams). The residue from this redistillation is combined with 138 grams of residue from the first fractionation, and the mixture is distilled to yield a bis(2-trichlorosilylethyl)benzene (134 grams), B. P. 155–159 degrees C. at 1 mm. Hg.

*Example 5*

An organosilicon compound (0.516 mole of a bis(2 - trichlorosilylethyl)benzene prepared by one of the procedures hereinbefore described) is charged into a glass chlorination tube approximately three feet in length, having an internal diameter of about 50 mm. The tube is packed at the bottom with Raschig rings (to a height of about 5 cm.) and fitted with a gas inlet tube (having an internal diameter of about 6 mm.) which is sealed through the bottom of the chlorination (reactor) tube so that the chlorine is discharged vertically (near the bottom of the reactor) into the organosilicon compound. The top of the reactor tube is fitted with a Dry-Ice condenser and a glass tube which conducts any gases not condensed in the Dry-Ice condenser to a water scrubber where the HCl formed by the chlorination is removed. The chlorination tube is illuminated with ultra-violet light from a "Mazda CH-4" 100 watt ultraviolet lamp. As chlorine gas is introduced into the chlorination tube, the evolved HCl is passed from the top of the Dry-Ice condenser to the scrubber. The scrub water is passed into a flask containing an equivalent amount of potassium hydroxide (0.516 mole) and methyl orange as an indicator. The chlorine is passed through the tube until the methyl orange indicator shows that the potassium hydroxide is neutralized. The liquid in the reactor tube (222 grams) comprises a mixture of unchlorinated and chlorinated bis(2-trichlorosilylethyl)benzenes, the latter believed to be a mixture comprising mainly a beta-(2-trichlorosilylethylphenyl) - beta - chloroethyltrichlorosilane, with small quantities of a bis(beta-trichlorosilyl-alpha-chloroethyl)benzene, a bis(beta-trichlorosilyl-beta-chloroethyl)benzene, a beta-(2-trichlorosilylethylphenyl)-alpha-chloroethyltrichlorosilane and a beta-(2-trichlorosilyl-beta-chloroethylphenyl)-beta-chloroethyltrichlorosilane.

Other organosilicon compounds of the invention may be produced by chlorinating by the procedure described in the preceding paragraph the following compounds (prepared as hereinbefore described): bis and tris(trichlorosilylethyl)chlorobenzenes, bis and tris(trichlorosilylisopropyl)benzenes, bis and tris(trichlorosilylethyl)dichlorobenzenes, and bis and tris(trichlorosilylisopropyl)dichlorobenzenes.

We claim:

1. An organosilicon compound having the general formula

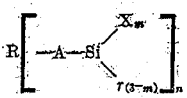

wherein R is an aromatic radical in which any atom other than carbon and hydrogen consists of a nuclear halogen having an atomic weight less than 80, and in which any exocyclic carbon atom is contained in a methyl side chain; A is a saturated divalent aliphatic radical, having from one to three carbon atoms, in which the free valences are connected through not more than two carbon atoms in series and in which any atom other than carbon and hydrogen consists of a halogen having an atomic weight between 35 and 80; X is a halogen having an atomic weight less than 80; $r$ is a saturated primary aliphatic hydrocarbon radical having from one to three carbon atoms; $m$ is an integer from 2 to 3; and $n$ is an integer from 2 to 3.

2. An organosilicon compound as claimed in claim 1 in which $m$ is 3.

3. An organosilicon compound as claimed in claim 2 in which R has six carbon atoms.

4. An organosilicon compound as claimed in claim 3 in which A has two carbon atoms.

5. An organosilicon compound as claimed in claim 4 in which $n$ is 2.

6. An organosilicon compound as claimed in claim 5 in which X is chloro.

7. A bis(2-trichlorosilylethyl)benzene.

8. A bis(2-trichlorosilylethyl)chlorobenzene.

9. A 2-(2-trichlorosilylethylphenyl)-2-chloroethyltrichlorosilane.

DAVID B. HATCHER.
RAYMOND H. BUNNELL.

REFERENCES CITED

The following references are of record in the file of this patent:

UNITED STATES PATENTS

| Number | Name | Date |
|---|---|---|
| 2,478,493 | Levine | Aug. 9, 1949 |
| 2,486,162 | Hyde | Oct. 25, 1949 |